3,557,041
VINYLIDENE CHLORIDE INTERPOLYMERS

Samuel Loshaek, Stamford, Conn., and Edward Charles Leonard, Jenkintown, Pa., assignors to The Borden Company, New York, N.Y., a corporation of New Jersey
No Drawing. Continuation of application Ser. No. 566,464, July 20, 1966. This application July 16, 1969, Ser. No. 847,503
Int. Cl. B44d *1/22;* C08f *15/40*
U.S. Cl. 260—29.6    10 Claims

ABSTRACT OF THE DISCLOSURE

The instant invention relates to the polymerized polymeric latex product of the monomers vinylidene chloride; vinyl chloride; a monomer selected from the group consisting of acrylonitrile, methacrylonitrile and mixtures thereof; and a monomer selected from the group consisting of normal $C_1$–$C_8$ alkyl acrylates and mixtures thereof; the combined proportion of the vinylidene chloride and vinyl chloride being in the range of about 85–97 parts by weight for 100 parts total monomers. More particularly, the invention relates to films made from said interpolymers and characterized as having low moisture vapor and oxygen transmission rates through the film and high flexibility.

---

This application is a continuation of application Ser. No. 566,464, filed July 20, 1966, now abandoned.

Films which include vinylidene chloride interpolymers are known and used. These films as presently made, however, suffer from a limitation that the desirable characteristics of low moisture vapor transmission, and long-term flexibility over wide temperature ranges are mutually incompatible characteristics of the known films containing vinylidene chloride interpolymers. Long term flexibility over wide temperature ranges is necessary, since end-use can be expected to be roughly over the temperature range of 0–100° F.

High proportions of vinylidene chloride in the interpolymers, as for example, 70% by weight and greater, increases the tendency of the interpolymer to crystallize. Although high crystallinity may increase resistance to moisture vapor transmission and films in which the proportion of the polymeric substance approach 100% vinylidene chloride polymer are highly crystalline and have very low moisture vapor transmission, such films are not flexible and are not usable as packaging materials or as coatings for other substrates. Further, homopolymers of vinylidene chloride are further limited in their usefulness due to the fact that they do not form films at room temperature. Interpolymers of vinylidene chloride such as with acrylic comonomers, tend to reduce the degree of crystallinity of the film made therewith thereby improving its flexibility characteristics, however, the moisture vapor transmission rate through the film is advanced beyond acceptable limits as the proportion of this comonomer is increased.

The present invention provides interpolymers and films thereof which overcome the limitations of the prior art. The films of this invention have high initial and long term flexibility over wide temperature ranges (i.e., 0–120° F.) and also have the desirable characteristics of having very low moisture vapor and oxygen transmission rates therethrough.

Briefly stated, the invention comprises the herein described interpolymer of vinylidene chloride, films formed therefrom, and the processes of making said interpolymer latex and films.

As the monomeric materials used to prepare the interpolymer, we have found that there is no substitute for high proportion of vinylidene chloride. Vinylidene chloride is used in proportion of up to about 92 parts by weight for 100 parts total monomers. Proportions greater than 92 parts have been found to impart a degree of crystallinity to the interpolymer which render the film formed therefrom unusable due to its inflexibility. Proportions of vinylidene chloride less than about 80% could be used, however, the moisture vapor transmission rates of films containing less than 80% are considered high for many commercial uses. Generally, for packaging purposes where low moisture vapor transmission is required, and as hereinafter described, we prefer at least 80 parts and for best results the range of proportions is about 83–91 parts of vinylidene chloride for 100 parts total monomers.

We have found further that including vinyl chloride as a comonomer of the interpolymer improves the flexibility of the film without increasing moisture vapor transmission beyond an insignificant amount which is inconsequential when compared to the increase when a like proportion of acrylic monomer is used.

Another monomer component used to make the interpolymer of this invention and which provides flexibility, and chemical and oil resistance to the film is selected from acrylo- and methacrylonitrile.

We have found that normal alkyl acrylates and preferably $C_1$–$C_8$ alkyl acrylates must be used as a monomer component for the interpolymer of this invention. These relatively soft acrylate esters improve the flexibility of the film to the desired level. Methyl acrylate has been found to be particularly useful for imparting flexibility to this film. It is believed that the flexibility-inducing properties of methyl acrylate are due to the closeness of the reactivity ratios of methyl acrylate and vinylidene chloride which leads to random inter-polymerization of these monomers in proportion of their concentration in the polymerization system. The low molecular weight of methyl acrylate provides more moles of interpolymerizable monomer per unit weight of the ester charged than is the case for the other acrylates of higher molecular weight, and therefore is more beneficial in causing disruption of the regular crystalline structure of the chloride units in the interpolymer. Other acrylates include butyl acrylate, hexyl acrylate and octyl acrylate.

In the instant invention, it has been found that the combination of all of the foregoing factors provides a vinylidene chloride interpolymer film having very low moisture vapor transmission rates and unexpectedly high flexibility.

The monomers described and in proportions employed for the interpolymer, are found to be critically balanced to provide increased flexibility, and reduced moisture vapor transmission, the latter being measured as moisture vapor transmission rate (MVTR). The interpolymers herein disclosed can readily be formed into films wherein the MVTR values (measured as grams of water passing through 100 square inches of film per 24 hours at 72° C. and approximately 100% relative humidity) are low and the most desirable films are generally less than 0.25 with minimum coating weight on the substrate. At this low MVTR excellent flexibility is maintained in the film. The coating or film weight on 3000 square feet (1 ream) of substrate, such as paper can be varied within economically desired limits, however, we have found that good results are obtained when coating weights are in the range of 6–15 pounds per 3000 square feet of substrate. Greater coating weights emphasize the low MVTR values, however, they are considered unnecessary.

Oxygen transmission rates through the film is measured as cubic centimeters of oxygen passing through 100 square inches of film in 24 hours under 1 atmosphere of pressure. Various thicknesses of film are compared.

The flexibility of the film is measured as percent extensibility with time, or ultimate elongation of the free film. Values were obtained as high as about 300% ultimate elongation after as long as 44 days at temperatures of about 40° C. Another method to determine flexibility is by the so-called dye penetration test, wherein, an organic solvent, such as turpentine, has dissolved therein a dye, and the solution is coated on a film coated substrate such as paper, etc. The film is creased at various temperatures and dye penetration is noted. Evidence of dye on the uncoated side shows a non-flexible film at that temperature. This test also gives indication of the grease resistance of the creased and uncreased coating.

The interpolymer is prepared in an aqueous emulsion system. A seed of the interpolymer is first prepared by causing polymerization to take place with a portion of the total monomers used, e.g., up to about 25%, followed by the growth stage polymerization of the remaining monomers. The monomers are preferably premixed in the proportions required and the seed and growth portions are taken therefrom. Polymerization is carried out in a substantially oxygen-free atmosphere, as for example, under a nitrogen blanket and elevated temperatures and pressures may be used to advantage. Surfactants are used to control particle size and polymerization rates.

Surfactants, and preferably, anionic surfactants such as salts of alkyl, alkaryl, and aryl sulfonates are used in the polymerization. Example of the anionic surfactants include sodium lauryl sulfate, and dodecyl benzene sodiumsulfonate, and the like. Non-ionic and cationic surfactants could be used, however, the efficiency of the emulsion polymerization is reduced as compared as anionic surfactants.

After the seed monomer has been added and dispersed in the aqueous medium, polymerization catalyst is added with additional quantities of surfactant being admixed therein during the initial polymerization stage.

As to the catalyst, water-soluble inorganic persulfate and peroxy materials are particularly well suited. Examples include potassium and ammonium persulfate and hydrogen peroxide. Preferably the water-soluble peroxy catalysts are employed in a reduction-oxidation system where reductants such as ascorbic acid, sodium formaldehyde sulfoxylate, sodium melta-bisulfite, and the like may be used in conjunction with the catalyst. When redox catalysts are used, continual intermittent addition of reducing agent to the polymerization medium has been found to enhance control of the polymerization.

During the growth stage, the remaining monomers are slowly added to the aqeuous seed system. Additional reducing agent and surfactant may be continually added during this stage.

In order to make good film-forming materials, we have found that the particle size of the interpolymer should be relatively small and as an average size, it is preferred to be less than about 2600 angstroms. Best results are obtained when the average particle size is less than about 2100 angstroms in cross-sectional dimension and the desirable average particle size is in the range of about 700–2100 angstroms. The particle size is affected by many factors, including surfactant concentration, agitation speed, temperature of reaction, catalyst concentration, and other variables. After interpolymerization has been completed, as noted by the reduced pressure level in the reaction vessel, the reaction is termed and the latex may be post-stabilized in accordance with common practice. Post-stabilization may include addition of surfactants, anti-foam agents, and other materials generally used. pH adjustments may also be made with a mild caustic solution to reduce acidity up to the range of about 3-4.

The proportion of solids in the latex is generally in the range of between about 45–65% and preferably between about 50–63%. Higher solids cause increasing problems in latex shear stability, latex viscosity, and in heat transfer in the latter stages of the polymerization while lower solids proportion are considered uneconomical in commercial application.

Films of the interpolymer are prepared by coating substrates with the latex at the solids level desired. The latex is applied on substrates by various means known in the art, as for example, metering knife, air knife, squeeze roll, gravure roll and curtain coating. The applied latex is dried at a temperature at least above the minimum film forming temperature of the interpolymer during which drying step it coalesces to form a continuous film as the water is removed. On a conventional air-knife coater, for example, the web drying temperature is usually maintained at about 200° F. Film formation temperature for the interpolymers of this invention is below 200° F. and as low as room temperature and below.

In the table that follows the weight proportions of the materials are set forth as illustrative of the invention in the broad range of proportions, and in the recommended range which provides the best conditions to make films of the properties desired. Proportions outside of the illustrative range are considered to be unnecessary. In the case of vinylidene chloride porportions greater than about 92 parts are considered outside the scope of this invention and in the case of vinylidene chloride and vinyl chloride, the combination of these two monomers is preferred to be about 85–97 parts for 100 total parts of monomers with best results in the range of 90–95 parts.

TABLE I

| Materials | Parts for 100 total parts of monomers | |
|---|---|---|
| | Illustrative | Recommended |
| Vinylidene chloride | (¹) | 83–91 |
| Vinyl chloride | .5–20 | 2–14 |
| Nitrile monomer | .5–14 | 1–10 |
| Acrylate monomer | .5–14 | 1–10 |

¹ Up to 92.

The comonomer vinyl chloride, is unique for this invention. In the prior art, in order to increase the flexibility of the film with minimal loss of moisture vapor transmission accompanying said increase, it was not permissible to reduce the vinylidene chloride proportion below about 92%. We have found that addition of vinyl chloride at the expense of vinylidene chloride, in the amounts indicated, has an inconsequential effect on reduction of the moisture vapor transmission, but effectively contributes to increased flexibility. The resulting film is extremely flexible, has very low MVTR and oxygen transmission rates, excellent grease resistance, and is economical. The table below shows the advantages of vinyl chloride addition.

TABLE II

| Composition (weight proportion) | Coating weight (lbs./ream) | MVTR¹ | Extensibility,² 4 days, percent-I.R. | Crystallinity,⁴ 15 days, percent-I.R. |
|---|---|---|---|---|
| a. Without Vinyl Chloride, VCl₂³/Nitrile/Acrylate | | | | |
| 92/5/3 | 9.5 | .29 | 20–.120 | Negl.–.125 |
| | 10.4 | .27 | | |
| | 20.6 | .15 | | |
| 92.5/4.5/3 | 9.8 | .19 | 200–.101 | Negl.–.122 |
| | 15.9 | .15 | | |
| 91.5/6/2.5 | 8.2 | .34 | 500–.050 | 50–.118 |
| | 15.8 | .21 | | |
| b. With Vinyl Chloride, VCl₂³/VCl³/Nitrile/Acrylate | | | | |
| 88/5.6/3/3.5 | 12 | .08 | 525–0 | 400–0 |
| | 16 | .07 | | |
| 86.5/6/2.5/5 | 8.2 | .22 | | |
| | 9.0 | .20 | 590–0 | 400–.02 |
| | 14.7 | .18 | | |

¹ MVTR determinations are made on paperboard coated in two passes, and dried at 80° C. for one minute after such coating. MVTR is determined after the paperboard is conditioned for 24 hours at 72° C. and 50% relative humidity over a 72 hour period after an initial equilibration period in a cabinet for about 4 hours. The change in weight due to moisture pickup with time is measured. The rate of moisture gain is constant after equilibration for 4 hours. The procedure is as outlined in The Association of the Pulp and Paper Institute, procedure No. 448.
² Percent elongation at break. "Negl." means negligible elongation determination on cast films in Tinius Olsen Tensile Tester.
³ VCl₂ is vinylidene chloride and VCl is vinyl chloride.
⁴ Infrared spectrum is a measure of crystallinity. Increasing IR values indicate increasing crystalline structure. Values are the ratio of absorbance at 11.3μ to 7.1μ.

The correlation between low crystallinity and high elongation is to be noted.

As to the substrate material upon which the film forming latexes may be coated and dried, it may be any material desired or required for a particular purpose. As for example, in the packaging industry and more specifically in the food packaging industry, paper products and other cellulosic materials such as for example, paper, paperboard, glassine, and the like are used. Plastics, such as cellophane, polyvinyl chloride, polyolefins such as polyethylene and polypropylene, and interpolymers of said plastics may be used as substrates for the film forming latex. In the general use of coated substrates, as for example, coated paper, the coated substrate should be highly impervious to moisture vapor transmission and highly flexible for the required need. The property of flexibility is especially useful where creases and folds are required to be made in the packaging material. A highly flexible film eliminates the possibility of forming cracks in the film which would raise the vapor transmission rates through the cracked film. Also contact with oily items would permit passage of the oil through the cracks. The packaging substrate may also be coated on both sides where desired for additional protection. In some cases, as for example in packaging of foods such as cheeses for display, it is desirable for commercial reasons to prevent excessive oxygen from entering the package and causing rancidity. The low oxygen transmission rate through the film of this invention makes it especially suitable for this purpose. Coating on a polyvinyl chloride and vinyl chloride containing polymer substrates have been found to give exceptionally good results.

In a modification of the preferred embodiment of this invention, the film can be made in the form of a self-supporting film as by coating the latex on an impervious substrate as for example glass, drying the latex until a continuous film has coalesced, and peeling or otherwise removing the film from the impervious substrate.

Another advantage of the coating made with the interpolymer herein described is the relatively low heat sealing temperature required to seal the coating with either another surface thereof or an uncoated surface as in the case of forming a package material. In order to get a good seal we have found that temperatures of heat sealing for the films of this invention are generally below 300° F. In one example, paper coated with 12 pounds per ream which was aged for about 14 days was heat sealed with a Sentinel Heat Sealer at a temperature of about 290° F. for .5 second and 20 p.s.i.

In the test which reflects flexibility and grease resistance of films of this invention, there is measured the permeation through greased film of a dye dissolved in turpentine at various temperatures. A sample of film is deemed to fail this test if dye (used as a convenience to detect the turpentine or other aromatic material) is seen to come through the surface of the film at the crease. Such failure indicates that the film was not sufficiently flexible to withstand creasing without cracking. Typical results show that 12 of 20 specimens passed at a crease temperature of 15° F., and 20 of 20 passed at 32° F. and also at 70° F. The same films resisted dye solvent penetration at these temperatures when not creased indicating that the latex formed a pin hole-free coating.

Typical oxygen transmission rates on films of this invention were .42 cc./100 sq. in./24 hrs./1 atm. for a double coat at 9 pounds per ream; .35 at 13.2, and; .3 at 16.

The examples that follow and elsewhere herein, proportions are expressed as parts by weight unless specifically stated to the contrary.

EXAMPLE I

Into a standard glass reaction vessel is added 530 gms. of deionized water, the aqueous system is purged with nitrogen, under reduced pressure. A nitrogen blanket at about 5 p.s.i.g. is maintained with stirring. 3.4 gms. of surfactant (sodium lauryl sulfate, 25% solids) is added and moderate heat is maintained. 13.2% (or 145 gms.) by weight of a mixture of the following monomers are added to the vessel.

| Monomers | Weight (gms.) | Percent |
| --- | --- | --- |
| Vinylidene chloride | 968 | 88.00 |
| Vinyl chloride | 60 | 5.45 |
| Acrylonitrile | 33 | 3.00 |
| Methylacrylate | 39 | 3.55 |
| Total | 1,100 | 100.00 |

Redox catalyst is added in proportion of 6 gms. of 17.5% hydrogen peroxide and 4.1 gms. of 5% ascorbic acid solution. The temperature is maintained at about 35°–40° C., additional reductant solution being added during the polymerization until the initial polymer is formed as noted by pressure drop to about 5–15 p.s.i.a. This phase of the polymerization takes about 2 hours.

Into the vessel containing the initial seed is slowly added the remaining 955 gms. of monomer mixture. Temperature is maintained in the range of 35–45° C. at pressures of about 30 p.s.i.a. until polymerization is substantially complete as noted by the drop in pressure. Additional reductant is added during polymerization. After about 5 hours, polymerization is substantially complete and surfactant and antifoaming agents are added for post stabilization. The latex is neutralized with 26.5 gms. of 5% NaOH solution to pH of about 3.5.

By way of illustration a paper substrate was coated with the latex of Example I and tested in use as moisture barrier packaging materials with the results indicated in Table III being obtained.

TABLE III

| Coating weight | MVTR | |
| --- | --- | --- |
| | Flat | Creased [1] |
| 12 pounds/ream | .08 | .13 |
| 13 pounds/ream | .12 | .10 |
| 16 pounds/ream | .07 | .10 |

| Temperature: | Heat sealability |
| --- | --- |
| 180° F | Poor |
| 200° F | Fair |
| 220° F | Good |
| 240° F | Good |

[1] Crease test MVTR values are obtained on coated substrates, that are creased at room temperature and then tested for MVTR.
[2] Determined on a Sentinel Heat Sealer at .5 second dwell time and 30 p.s.i.

EXAMPLE II

The process of Example I repeated except that the proportions of the monomers are varied within the limits shown in Table I. Films are coated on to substrates as described. The coated substrates have very low MVTR and oxygen transfer values, and high flexibility.

EXAMPLE III

The process of Example II is repeated except that the acrylonitile is replaced by like proportions of methacrylonitile and the methyl acrylate is replaced separately and in turn with like proportions of the $C_1$–$C_8$ alkyl acrylates described. Films coated onto substrates have properties similar to the coated film of Example I.

It will be understood that it is intended to cover all changes and modifications of the examples of the invention herein chosen for the purpose of illustration which do not constitute departures from the spirt and scope of the invention.

We claim:
1. An interpolymer consisting essentially of the polymerized polymeric latex product of the monomers:
   (1) vinylidene chloride in proportion of at least 80 parts by weight and up to about 92 parts by weight for 100 parts total monomer;

(2) vinyl chloride in proportion of .5–20 parts by weight for 100 parts total monomers;
(3) a monomer selected from the group consisting of acrylonitrile, methacrylonitrile and mixtures thereof in proportion of .5–14 parts by weight for 100 parts total monomers, and;
(4) a monomer selected from a group consisting of normal $C_1$–$C_8$ alkyl acrylates and mixtures thereof in proportion of .5–14 parts by weight for 100 parts total monomers;

the combined proportion of said vinylidene chloride and said vinyl chloride being in the range of about 85–97 parts by weight for 100 parts total monomers.

2. The latex product of claim 1 wherein said alkyl acrylate is methyl acrylate.

3. The latex product of claim 2 wherein:
(1) the proportion of said vinylidene chloride is 83–91 parts by weight for 100 parts total monomers;
(2) the proportion of said vinyl chloride is 2–14 parts by weight for 100 parts total monomers;
(3) said nitrile monomer is acrylonitrile in proportion of 1–10 parts by weight for 100 parts total monomers, and;
(4) the proportion of said methyl acrylate is 1–10 parts by weight for 100 parts total monomers.

4. The interpolymer of claim 1 in film form.

5. A coated substrate comprising;
(1) a substrate, and;
(2) the interpolymer of claim 4.

6. The coated substrate of claim 5 wherein:
(1) said substrate is selected from the group consisting of cellulosic materials, and plastics, and;
(2) said interpolymer is the latex product of claim 3 in film form.

7. The coated substrate of claim 6 wherein said substrate comprises paper.

8. The coated substrate of claim 6 wherein said substrate comprises vinyl chloride containing polymer.

9. The process of making a polymeric film characterized as having a low moisture vapor and oxygen transmission rate and high ultimate extensibility comprising the steps of:
(1) coating the latex product of claim 1 onto a substrate, and;
(2) drying said coating to form a continuous film.

10. The process of claim 9 wherein said latex product is the product of claim 3.

References Cited

UNITED STATES PATENTS

| | | | |
|---|---|---|---|
| 2,538,737 | 1/1951 | Stanton et al. | 260—29.6(T) |
| 3,317,449 | 5/1967 | Issacs et al. | 260—29.6(T) |
| 3,328,330 | 6/1967 | Trofimow et al. | 260—29.6(T) |
| 3,423,346 | 1/1969 | Klauss et al. | 260—80.77 |

FOREIGN PATENTS

| | | | |
|---|---|---|---|
| 980,123 | 1/1965 | Great Britain | 260—80.77 |

MURRAY TILLMAN, Primary Examiner

W. J. BRIGGS, Sr., Assistant Examiner

U.S. Cl. X.R.

117—138.8, 155; 260—80.77